(12) United States Patent
Tanonaka

(10) Patent No.: US 6,628,674 B1
(45) Date of Patent: Sep. 30, 2003

(54) APPARATUS DEPENDING ON TIMING SOURCE FOR SYNCHRONIZATION

(75) Inventor: Kouji Tanonaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/370,604

(22) Filed: Aug. 9, 1999

(30) Foreign Application Priority Data

Feb. 17, 1999 (JP) .......................................... 11-039102

(51) Int. Cl.[7] .................................................. H04J 3/06
(52) U.S. Cl. ........................ 370/503; 370/507; 375/358; 375/357
(58) Field of Search ................................ 333/109, 115; 370/503, 504, 505, 506, 507, 508, 509, 511, 512; 375/354, 356, 357, 358

(56) References Cited

U.S. PATENT DOCUMENTS

| | | | | |
|---|---|---|---|---|
| 5,579,513 A | * | 11/1996 | Strohmer | 713/600 |
| 5,600,648 A | * | 2/1997 | Furuta | 370/248 |
| 5,682,408 A | * | 10/1997 | Tanonaka | 375/354 |
| 5,886,996 A | * | 3/1999 | Wolf | 370/507 |
| 5,956,347 A | * | 9/1999 | Slater | 370/503 |
| 6,169,753 B1 | * | 1/2001 | Yoshida | 370/507 |
| 6,173,023 B1 | * | 1/2001 | Tanonaka | 375/357 |
| 6,185,216 B1 | * | 2/2001 | Chapman | 370/402 |
| 6,317,475 B1 | * | 11/2001 | Kasurinen | 375/356 |
| 6,418,151 B1 | * | 7/2002 | Walter | 370/503 |

FOREIGN PATENT DOCUMENTS

| | | |
|---|---|---|
| JP | 5-56023 | 3/1993 |
| JP | 8-288959 | 11/1996 |
| JP | 11-239161 | 8/1999 |

* cited by examiner

Primary Examiner—Douglas Olms
Assistant Examiner—Ricardo M. Pizarro
(74) Attorney, Agent, or Firm—Katten Muchin Zavis Rosenman

(57) ABSTRACT

An apparatus which depends on one of a plurality of master clocks as a timing source includes a timing-dependency-direction-identifier-extraction unit which detects an identifier indicative of a direction of timing dependency from a received signal with respect to each of the master clocks, a timing-quality-information-extraction unit which detects a code indicative of a timing quality from the received signal with respect to each of the master clocks, and a synchronization unit which selects the timing source based on the code indicative of a timing quality, and identifies a direction of timing dependency of the timing source based on the identifier indicative of a direction of timing dependency.

14 Claims, 22 Drawing Sheets

P : Master Clock(Primary)
S : Master Clock(Secondary)
NE : Network Element
———▸ : TRANSFER LINE
———▸ : EXTERNAL CLOCK INPUT
----▸ : ROUTE OF TIMING TRANSFER
———▸ : DIRECTION OF TIMING DEPENDENCY P : Master Clock(Primary)
S : Master Clock(Secondary)
NE : Network Element
———: TRANSFER LINE
———▶: EXTERNAL CLOCK
--->: ROUTE OF TIMING TRANSFER
———▶: DIRECTION OF TIMING DEPENDENCY P : Master Clock(Primary)
S : Master Clock(Secondary)
NE : Network Element
⟶ : TRANSFER LINE
⟶ : EXTERNAL CLOCK INPUT
---⟶ : ROUTE OF TIMING TRANSFER
⟶ : DIRECTION OF TIMING DEPENDENCY P : Master Clock(Primary)
S : Master Clock(Secondary)
NE : Network Element
⎯⎯► : TRANSFER LINE
⎯→ : EXTERNAL CLOCK INPUT
--->  : ROUTE OF TIMING TRANSFER
⎯► : DIRECTION OF TIMING DEPENDENCY M1 : Master Clock1      ⟶ : EXTERNAL INPUT
M2 : Master Clock2      ⟶ : TRANSFER LINE
M3 : Master Clock3

M1 : Master Clock1
M2 : Master Clock2
M3 : Master Clock3

→ : EXTERNAL INPUT
— : TRANSFER LINE
---→ : DIRECTION OF TIMING DEPENDENCY

M1 : Master Clock1
M2 : Master Clock2
M3 : Master Clock3

⟶ : EXTERNAL INPUT
⟶ : TRANSFER LINE
---▶ : DIRECTION OF TIMING DEPENDENCY

M1 : Master Clock1
M2 : Master Clock2
M3 : Master Clock3

⟶ : EXTERNAL INPUT
⟶ : TRANSFER LINE
--⟶ : DIRECTION OF TIMING DEPENDENCY

FIG.13

PRIOR ART

| PRIORITY | ADDRESS |
|---|---|
| 1 | X001 |
| 2 | X010 |
| 3 | X100 |

FIG.14

PRIOR ART

| SSMB CODE | DESCRIPTION | SSMB CODE | DESCRIPTION |
|---|---|---|---|
| 0000 | QUALITY UNKNOWN | 1000 | G.812 LOCAL |
| 0001 | RESERVED | 1001 | RESERVED |
| 0010 | G.811 | 1010 | RESERVED |
| 0011 | RESERVED | 1011 | SETS |
| 0100 | G.812 TRANSIT | 1100 | RESERVED |
| 0101 | RESERVED | 1101 | RESERVED |
| 0110 | RESERVED | 1110 | RESERVED |
| 0111 | RESERVED | 1111 | DON'T USE FOR SYNC. |

FIG. 15

PRIOR ART

| ADDRESS IN REGISTER | TABLE SYNCHRONIZATION UNIT | | | | VALUES SET BY MICROCOMPUTER | | | | CONVERTED QUALITY VALUE |
|---|---|---|---|---|---|---|---|---|---|
| 0 0 (h) | 0 | 0 | 0 | 0 | 0 | 0 | 1 | 0 | 2 |
| 0 1 (h) | 0 | 0 | 0 | 1 | 0 | 1 | 1 | 0 | 6 |
| 0 2 (h) | 0 | 0 | 1 | 0 | 0 | 0 | 1 | 0 | 2 |
| 0 3 (h) | 0 | 0 | 1 | 1 | 0 | 1 | 1 | 0 | 6 |
| 0 4 (h) | 0 | 1 | 0 | 0 | 0 | 0 | 1 | 1 | 3 |
| 0 5 (h) | 0 | 1 | 0 | 1 | 0 | 1 | 1 | 0 | 6 |
| 0 6 (h) | 0 | 1 | 1 | 0 | 0 | 1 | 1 | 0 | 6 |
| 0 7 (h) | 0 | 1 | 1 | 1 | 0 | 1 | 1 | 0 | 6 |
| 0 8 (h) | 1 | 0 | 0 | 0 | 0 | 1 | 0 | 0 | 4 |
| 0 9 (h) | 1 | 0 | 0 | 1 | 0 | 1 | 1 | 0 | 6 |
| 0 A (h) | 1 | 0 | 1 | 0 | 0 | 1 | 1 | 0 | 6 |
| 0 B (h) | 1 | 0 | 1 | 1 | 0 | 1 | 0 | 1 | 5 |
| 0 C (h) | 1 | 1 | 0 | 0 | 0 | 1 | 1 | 0 | 6 |
| 0 D (h) | 1 | 1 | 0 | 1 | 0 | 1 | 1 | 0 | 6 |
| 0 E (h) | 1 | 1 | 1 | 0 | 0 | 1 | 1 | 0 | 6 |
| 0 F (h) | 1 | 1 | 1 | 1 | 0 | 1 | 1 | 0 | 6 |

P : Master Clock(Primary)
S : Master Clock(Secondary)
NE : Network Element
⟶ : TRANSFER LINE
⟶ : EXTERNAL CLOCK INPUT
---> : ROUTE OF TIMING TRANSFER
⟶ : DIRECTION OF TIMING DEPENDENCY P : Master Clock(Primary)
S : Master Clock(Secondary)
NE : Network Element
⟶ : TRANSFER LINE
⟶ : EXTERNAL CLOCK INPUT
---> : ROUTE OF TIMING TRANSFER
⟶ : DIRECTION OF TIMING DEPENDENCY P : Master Clock(Primary)
S : Master Clock(Secondary)
NE : Network Element
⟶ : TRANSFER LINE
⟶ : EXTERNAL CLOCK INPUT
--⟶ : ROUTE OF TIMING TRANSFER
⟶ : DIRECTION OF TIMING DEPENDENCY

FIG.20

| Frame No. | DATA | | | | | | | |
|---|---|---|---|---|---|---|---|---|
| | NSB | 2 | 3 | 4 | 5 | 6 | 7 | LSB |
| 0 | $F_0$ | $C_1$ | $C_2$ | $C_3$ | $C_4$ | $C_5$ | $C_6$ | $C_7$ |
| 1 | $F_1$ | $X_{11}$ | $X_{12}$ | $X_{13}$ | $X_{14}$ | $X_{15}$ | $X_{16}$ | $X_{17}$ |
| ? | ? | ? | ? | ? | ? | ? | ? | ? |
| 14 | $F_E$ | $X_{E1}$ | $X_{E2}$ | $X_{E3}$ | $X_{E4}$ | $X_{E5}$ | $X_{E6}$ | $X_{E7}$ |
| 15 | $F_F$ | $X_{F1}$ | $X_{F2}$ | $X_{F3}$ | $X_{F4}$ | $X_{F5}$ | $X_{F6}$ | $X_{F7}$ |

$Fm(m=0\sim F)$ : MULTI-FRAME INDICATOR BIT ($F_0$:1, $F_1\sim F$:0)

$Cn(n=1\sim 7)$ : CRC-7 PARITY BIT $Xmn(m=1\sim F, n=1\sim 7)$ : ASCII CODE

- P : Master Clock(Primary)
- S : Master Clock(Secondary)
- NE : Network Element
- ⎯→ : TRANSFER LINE
- ⎯→ : EXTERNAL CLOCK INPUT
- ---→ : ROUTE OF TIMING TRANSFER
- ⎯▶ : DIRECTION OF TIMING DEPENDENCY

APPARATUS DEPENDING ON TIMING SOURCE FOR SYNCHRONIZATION

BACKGROUND OF THE INVENTION

1. Field of the Invention

The present invention generally relates to a dependent synchronous apparatus and an SDH (synchronous digital hierarchy) apparatus having the dependent synchronous apparatus, and particularly relates to a dependent synchronous apparatus capable of identifying a direction of a timing dependency and an SDH apparatus having such a dependent synchronous apparatus.

2. Description of the Related Art

SDH networks employ a dependent-synchronization scheme. SDH networks are a synchronous network, and, thus, it is vital to maintain synchronization at all times. To this end, various measures are taken in order to avoid severing of a synchronous network caused by master-clock failures or failures of communication lines for transferring timing signals.

FIG. 1 is an illustrative drawing showing a schematic configuration of an SDH network.

The network of FIG. 1 includes a primary master clock 19 and a secondary master clock 20. More than one master clock is provided in order to insure redundancy.

The network also includes network elements NE1 through NE4. A network element that receives an output of a master clock directly therefrom is referred to as a gateway network element (GNE) of a synchronous system. In FIG. 1, the network element NE1 and the network element NE2 are gateway network elements.

Each network element is provided with a function to select a timing source so that the network element operates in synchronism with the selected timing source. The timing-source selection function of each network element NE usually allows a plurality of timing sources to be selected and given priority. Prioritized timing sources are monitored all the time with regard to quality thereof, and a timing source having the highest quality is selected for use. If more than one timing source exhibits the same quality, a timing source having the highest priority is selected for use. If the timing source currently in use is degraded in terms of quality thereof, a timing source having the next highest quality automatically replaces the current timing source.

Quality of timing sources is transferred via an overhead in the case of an STM-n (synchronous transfer mode-n).

FIG. 2 is an illustrative drawing showing a format of an STM-1 overhead.

An STM-1 overhead is comprised of 3 rows of RSOH (regenerator section over head), a pointer row, and 6 rows of MSOH (multiplex section over head). RSOH is terminated at each transit apparatus, and RSOH is terminated at a transit apparatus connected to a terminal. A pointer in the pointer row indicates a start position of a signal in the payload.

FIG. 3 is an illustrative drawing showing an S1 byte of an SOH (section over head). Here, the S1 byte is a Z1#1 byte of an old system.

As shown in FIG. 3, quality of a timing source is transferred by using SSMB, which is inserted into four lower bits of the S1 byte.

As will be described later, SSMB is defined by binary codes shown in ITU-T, G.708. These binary codes define quality of a SDH timing with respect to each combination of the four bits of SSMB. For example, "0010(02h)" indicates that a timing source has a quality equivalent to that of "G.811" (a primary timing source using a cesium atomic oscillator), and "1111" indicates that the timing source should not be used for synchronization.

The network element NE1 of FIG. 1 is a gateway network element of the synchronous system, and, thus, selects an external clock input A from the primary master clock 19 as a timing source of a first priority. When quality of the external clock input A from the primary master clock 19 degrades, a transfer line G is selected as a timing source of a second priority since a clock in synchronism with the secondary master clock 20 is now necessary.

The network element NE2 needs a clock from the network element NE1 such that the clock is in synchronism with the primary master clock 19, and, thus, selects a transfer line B as a timing source of a first priority. When quality of the transfer line B degrades, a transfer line F is selected as a timing source of a second priority since a clock in synchronism with the secondary master clock 20 is now necessary.

The network element NE3 needs a clock from the network element NE2 such that the clock is in synchronism with the primary master clock 19, and, thus, selects a transfer line C as a timing source of a first priority. When quality of the transfer line C degrades, a transfer line E is selected as a timing source of a second priority since a clock in synchronism with the secondary master clock 20 is now necessary.

The network element NE4 needs a clock from the network element NE3 such that the clock is in synchronism with the primary master clock 19, and, thus, selects a transfer line D as a timing source of a first priority. When quality of the transfer line D degrades, an external clock input H from the secondary master clock 20 is selected as a timing source of a second priority since a clock in synchronism with the secondary master clock 20 is now necessary.

A synchronous network is established in such a manner as described above.

In FIG. 1, the primary master clock 19 may be comprised of a cesium atomic oscillator, and the secondary master clock 20 may be comprised of a rubidium atomic oscillator. A description of such a configuration will be given in the following.

The network element NE1 transmits an SSMB code "02h" to the next network element NE2 as an S1 byte signal of MSOH via the transfer line B. Here, the SSMB code "02h" indicates a timing quality of the primary master clock 19 that is connected to the network element NE1 and comprised of a cesium atomic oscillator. By the same token, the network element NE2 transmits the SSMB code "02h" to the network element NE3 as a S1-byte signal of MSOH via the transfer line C. The network element NE3 transmits the SSMB code "02h" to the network element NE4 as a S1-byte signal of MSOH via the transfer line D. Further, an SSMB code transferred on the transfer lines E, F, and G is set to "0Fh" in order to prevent a synchronous loop.

FIG. 4 is an illustrative drawing showing a situation where a failure occurs in the primary master clock 19 or on the output transfer line thereof, and the external clock input A from the primary master clock 19 has a degraded quality. In such a situation, switching of a timing source is effected in each network element, so that the SDH network as a whole is synchronized with the secondary master clock 20.

When a failure occurs with respect to the external clock input A form the primary master clock 19, the network element NE1 detects the failure, and lapses in a hold-over status. The network element NE1 changes the SSMB code from "02h" to "0BhSETS(synchronization equipment timing source)" in response to the change of quality of the timing source, and sends this SSMB code to the network element NE2 via the transfer line B. The network element NE2 transmits the SSMB code "0Bh" to the network element NE3 via the transfer line C. By the same token, the network element NE3 transfers the SSMB code "0Bh" to the next network element NE4 via the transfer line D. Consequently, the entire network is put in a hold-over status originating from the network element NE1.

In such a status, the network element NE4 compares the timing quality (SSMB code "0Bh") of the transfer line D having the first priority with a timing quality (SSMB code "04h") of the external clock input H having the second priority and originating from the secondary master clock 20, which is comprised of a rubidium atomic oscillator. The network element NE4 selects the timing source of the second priority because of a higher quality thereof, and sends the SSMB code "04h" to the network element NE3 via the transfer line E. The network element NE3 attends to a similar comparison to select the timing source of the second priority, and sends the SSMB code "04h" to the network element NE2 via the transfer line F. By the same token, the network element NE2 also selects the timing source of the second priority, and transfers the SSMB code "04h" to the network element NE1 via the transfer line G. Finally, the network element NE1 selects the timing source of the second priority since this timing source has a higher timing quality than its hold-over status.

As a result, the network elements NE1 through NE4 are now synchronized with the secondary clock signal that is supplied from the secondary master clock 20. Here, an SSMB code on the transfer lines B, C, and D is set to "0Fh" in order to prevent a synchronous loop.

FIG. 5 is an illustrative drawing showing a situation where quality of the transfer line C degrades, and the timing source is switched in the network elements NE3 and NE4.

The network element NE3 lapses into a hold-over status, and sends the SSMB code "0Bh" to the network element NE4 via the transfer line D. After this, the network element NE4 compares the timing quality (SSMB code "0Bh") of the transfer line D having the first priority with the timing quality (SSMB code "04h") of the external clock input H having the second priority and originating from the secondary master clock 20, which is comprised of the rubidium atomic oscillator. The network element NE4 selects the timing source of the second priority because of a higher quality thereof, and sends the SSMB code "04h" to the network element NE3 via the transfer line E. The network element NE3 attends to a similar comparison to select the timing source of the second priority, and sends the SSMB code "04h" to the network element NE2 via the transfer line F. The network element NE2 compares the SSMB code of the transfer line B with the SSMB code of the transfer line F, and keeps the current timing source.

The related-art as described above provides no means for monitoring a direction of a synchronization signal, which the network elements depend on. In order to monitor such a direction, therefore, a direction of a timing source is checked with respect to each network element, and the check results are analyzed to trace the network configuration.

In recent years, SDH networks have increased their size and complexity. This is often observed, especially, when existing SDH networks are connected together, or are connected to new SDH networks to expand the size.

FIG. 6 is an illustrative drawing showing a schematic configuration of a mesh network. The mesh network is a typical example of a large-size and complex SDH network often observed these days.

In the mesh network as shown in FIG. 6, networking of main signals is complex, and, also, networking of an SDH synchronization system is equally complex. As a complexity of a network increases, an longer time is necessary for designing and implementing a network, and it is more likely to suffer erroneous connections or erroneous setting of timing sources. Further, switching of a direction of a timing dependency (i.e., switching of timing sources) may occur in a synchronous system because of degradation of synchronization signals. In a complex network environment, therefore, it is prohibitively difficult to check which network elements depend on the primary master clock.

FIG. 7 is an illustrative drawing showing three SDH networks each having its own master clock. FIG. 8 is an illustrative drawing showing a process of integrating the three SDH networks via a network element NE19 of the network Network-2. FIG. 9 is an illustrative drawing showing an integrated SDH network.

In order to integrate the three SDH networks via the network element NE19, a network element NE12 of the network Network-1 and a network element NE20 of the network Network-3 are connected to the network element NE19 of the network Network-2. This establishes connections for main signals. Beyond this, the integrated SDH network must be synchronized with a single master clock.

As can be understood from FIG. 8, almost all the network elements need to change timing-source settings in order to synchronize the entire network under the same master clock. Further, the network element NE19 must attend to highly complex connections between each network element.

Accordingly, there is a need for a dependent synchronization apparatus which can facilitate implementation of a network, can eliminate erroneous setting of timing sources, and can allow a direction of a timing dependency to be easily checked even after an automatic switching of a direction of a timing dependency.

SUMMARY OF THE INVENTION

Accordingly, it is a general object of the present invention to provide a dependent synchronous apparatus which can satisfy the need described above.

It is another and more specific object of the present invention to provide a dependent synchronization apparatus which can facilitate implementation of a network, can eliminate erroneous setting of timing sources, and can allow a direction of a timing dependency to be easily checked even after an automatic switching of a direction of a timing dependency.

In order to achieve the above objects according to the present invention, an apparatus which depends on one of a plurality of master clocks as a timing source includes a timing-dependency-direction-identifier-extraction unit which detects an identifier indicative of a direction of timing dependency from a received signal with respect to each of the master clocks, a timing-quality-information-extraction unit which detects a code indicative of a timing quality from the received signal with respect to each of the master clocks, and a synchronization unit which selects the timing source based on the code indicative of a timing quality, and identifies a direction of timing dependency of the timing source based on the identifier indicative of a direction of timing dependency.

When the apparatus as described above is used as a network element in a network, a direction of timing dependency can be easily identified with respect to each of the network elements by checking the identifier indicative of a direction of timing dependency detected in each of the network elements. Since a check of a direction of timing dependency is easily made with respect to each network element, speedy implementation of a large network is facilitated, and erroneous setting of timing sources is eliminated.

Other objects and further features of the present invention will be apparent from the following detailed description when read in conjunction with the accompanying drawings.

BRIEF DESCRIPTION OF THE DRAWINGS

FIG. 13 is a table showing an example of allocation of addresses to priority levels;

FIG. 14 is a table showing allocation of bit patterns to SSMB codes;

FIG. 15 is a table showing an example of a quality list of SSMB codes;

FIG. 20 is a table showing a 16-multi-frame configuration the same as used in a section trace or a path trace;

DESCRIPTION OF THE PREFERRED EMBODIMENTS

In the following, embodiments of the present invention will be described with reference to the accompanying drawings.

Figure 10:
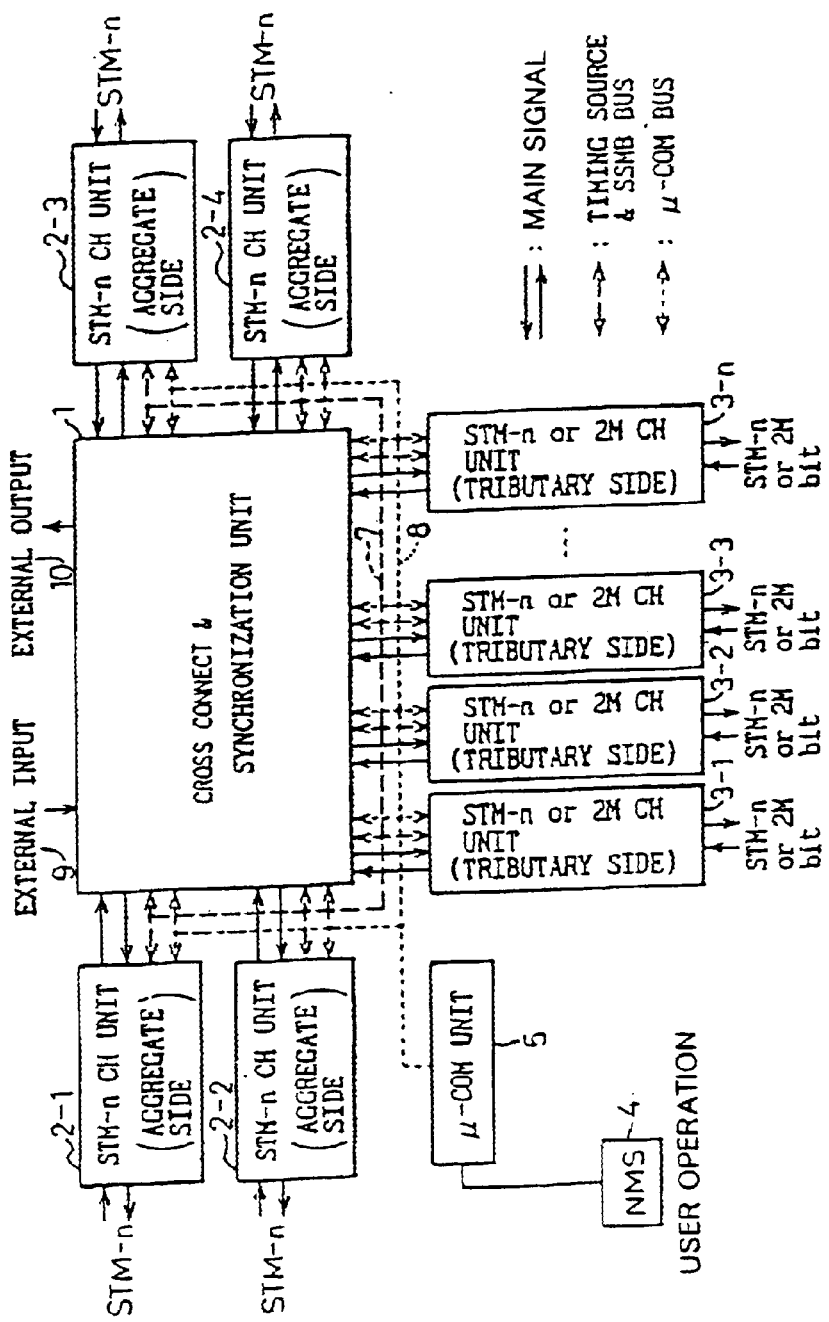
FIG. 10 is a block diagram of a dependent synchronous apparatus used in an SDH apparatus.

FIG. 10 is a block diagram of a dependent synchronous apparatus used in an SDH apparatus.

A cross-connect-&-synchronization unit 1 includes a cross-connect unit for switching paths for main signals via insert/drop functions and a synchronization unit for establishing network synchronization. As will be described later in detail, the cross-connect-&-synchronization unit 1 attends to dependent synchronization. The cross-connect-&-synchronization unit 1 is connected to STM-n channel units 2-1 through 2-4 on the aggregate side and STM-n-or-2 M channel units 3-1 through 3-n on the tributary side. As will be described later in detail, these channel units insert or extract dependent-synchronization information about an SSMB code and a master clock.

A network-management system (NMS) 4 is provided for the purpose of making settings for maintenance and operation of the network. A microcomputer unit 5 connected to the network-management system 4 makes settings to the cross-connect-&-synchronization unit 1, the STM-n channel units 2-1 through 2-4, and the STM-n-or-2 M channel units 3-1 through 3-n in accordance with instructions provided from the network-management system 4.

Connections between the cross-connect-&-synchronization unit 1 and any one of the STM-n channel units 2-1 through 2-4 and the STM-n-or-2 M channel units 3-1 through 3-n are provided via main signals in two ways. All of these units are connected to a microcomputer bus 8 of the microcomputer unit 5, and are further connected to a timing-source-&-SSMB bus 7. An external timing is supplied from an external input 9. It should be noted that the cross-connect-&-synchronization unit 1 may be divided into the cross-connect unit and the synchronization unit.

Figure 11:
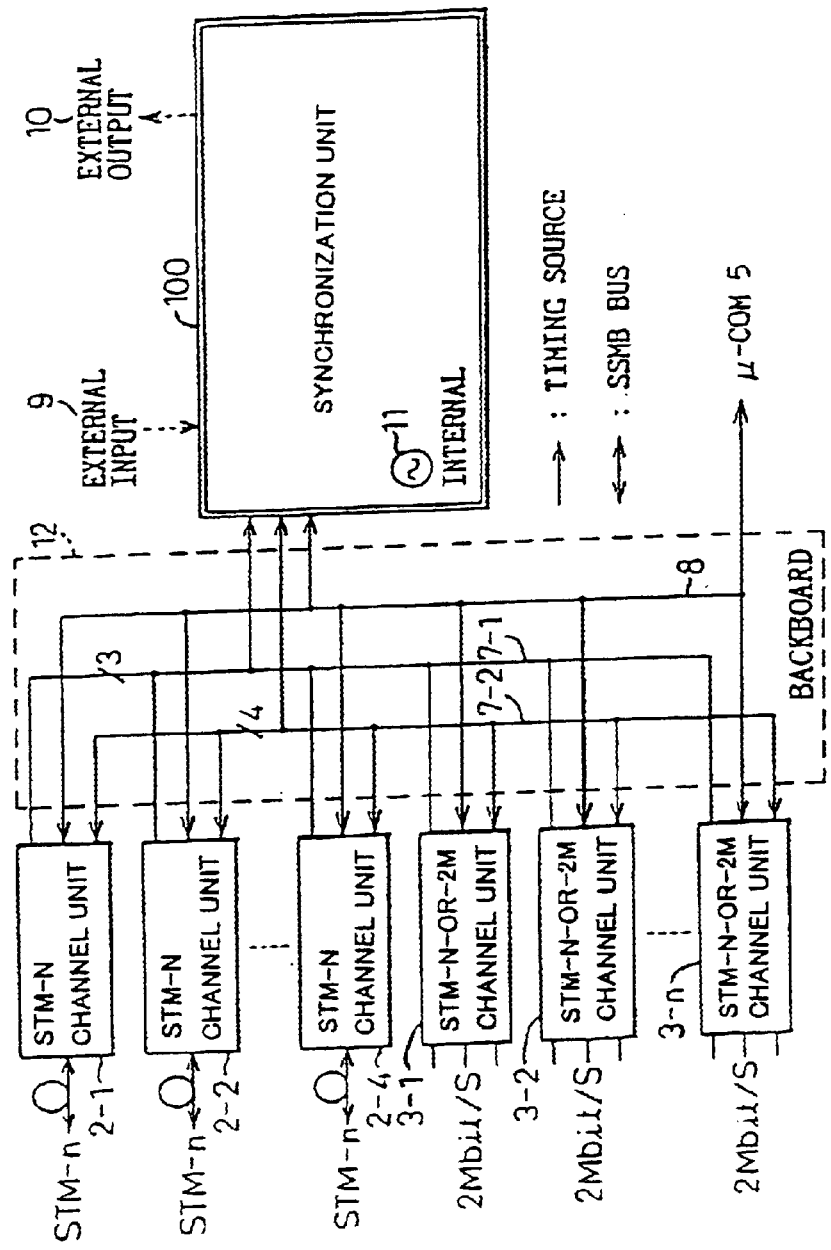
FIG. 11 is an illustrative drawing showing a layout of connections of a synchronization system of a cross-connect-&-synchronization unit.

FIG. 11 is an illustrative drawing showing a layout of connections of a synchronization system of the cross-connect-&-synchronization unit 1. FIG. 11 shows an example of connections between a synchronization unit 100 of the cross-connect-&-synchronization unit 1 and each of the channel units.

In FIG. 11, all the synchronous units are connected with each other via three timing-source lines 7-1 and four SSMB-bus lines 7-2, which are laid out on a backboard 12. The microcomputer bus 8 of the microcomputer unit 5 is also connected to each unit via the backboard 12. A bus width of the microcomputer bus 8 depends on the type of a microcomputer used in the system.

A timing source includes the external input 9, 2 M tributaries, STM-n lines, and an internal source 11. The external input 9 is provided with four ports with respect to 2 M bit/second (X), 2 M bit/second (Y), 2 M Hz (X), and 2 M Hz (Y), and is input to the synchronization unit 100.

Timing inputs (2 M tributaries) of the STM-n-or-2 M channel units 3-1 through 3-n are provided with three ports per channel unit. Synchronization inputs (STM-n lines) of the STM-n channel units 2-1 through 2-4 are one port per channel unit. Further, one port is provided for the internal source 11, which is an oscillator of a predetermined frequency.

Only those channel units which are selected by a user supply timing signals to the synchronization unit 100. The timing-source lines 7-1 laid out on the backboard 12 includes a line for priority P1, a line for priority P2, and a line for priority P3. Channel units that have priority thereof set by the user supply respective timing-source signals to corresponding lines.

The SSMB information is transferred via the SSMB-bus lines 7-2 on the backboard 12 between the synchronization unit 100 and the channel units that have priority thereof set by the user. That is, the STM-n channel units 2-1 through 2-4 extract an S1 byte of MSOH from received STM-n signals, and transmit the SSMB information to the synchronization unit 100.

The STM-n-or-2 M channel units 3-1 through 3-n and the external input 9 never receive SSMB information from an external source, so that they supply user-provided SSMB information to the synchronization unit 100. The synchronization unit 100 sends an SSMB code of the currently selected timing source to the STM-n channel units 2-1 through 2-4 in order to inform a network or other SDM apparatuses of a timing quality of the timing source that is currently in use for the synchronization purpose.

Figure 12:
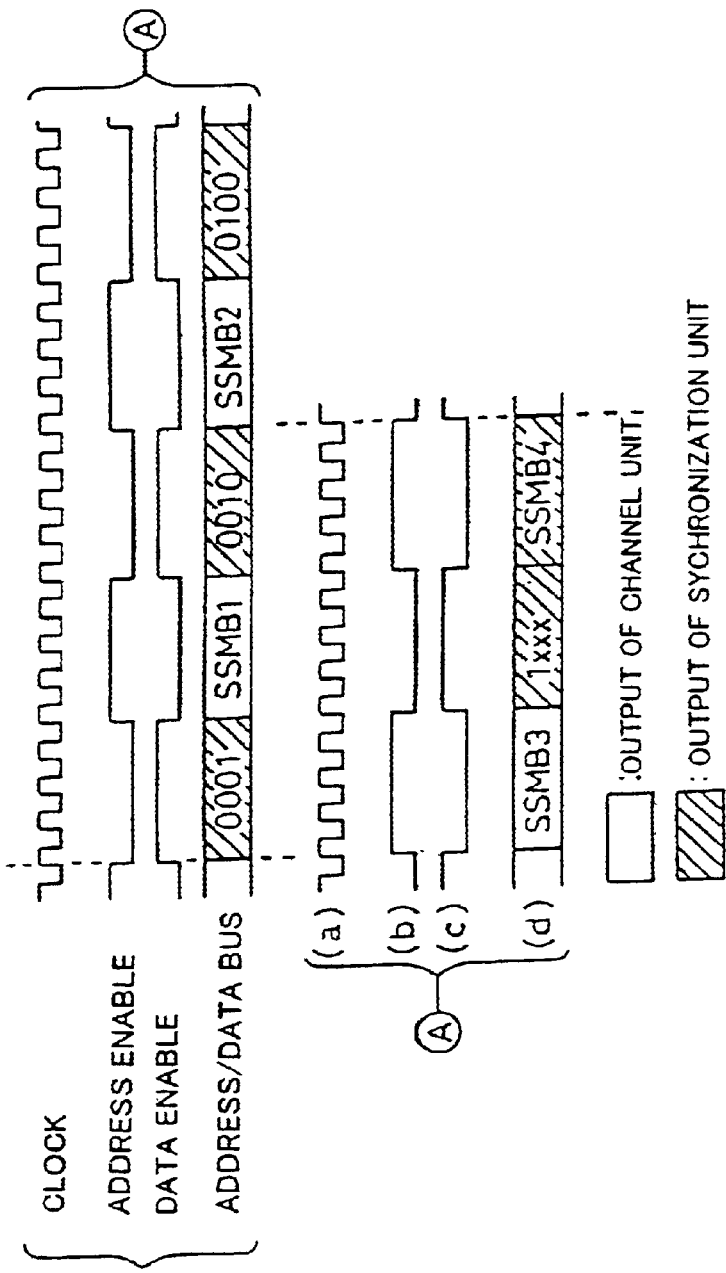
FIG. 12 is an illustrative drawing demonstrating waveforms of signals on SSMB-bus lines.

FIG. 12 is an illustrative drawing demonstrating waveforms of signals on the SSMB-bus lines. FIG. 13 is a table showing an example of allocation of addresses to priority levels.

As shown in FIG. 12, the SSMB-bus lines carry a clock signal, an address-enable signal, a data-enable signal, and address/data-bus signals.

A low-frequency clock signal having a frequency of 300 KHz or the like is used as a clock signal. The synchronization unit 100 supplies the clock signal to each channel unit. The address-enable signal and the data-enable signal indicate an enable status when these signals are at a low level. Here, an address indicates a priority level that is set to an STM-n-or-2 M channel unit by the microcomputer unit 5 so as to supply a timing source. By using this address, the synchronization unit 100 identifies a timing source that corresponds to data on the address/data bus.

As shown in FIG. 13, an address "0001" is output to the bus when the synchronization unit 100 is to receive an SSMB code of a channel unit that has a priority level thereof set to 1. Upon receiving this address, the channel unit of the priority level 1 inserts an SSMB code of a received S1 byte into a time slot of the SSMB, and transmits the SSMB to the synchronization unit 100 during the following low-level period of the data-enable signal. In the case of a 2 M-channel unit, a user-provided SSMB code is output to the bus.

When the most significant bit (X) of an address shown in FIG. 13 is set to "0", the channel unit having a corresponding priority level inserts a four-bit SSMB code received from an external line into a time slot (shown as SSMB1 through SSMB3 in FIG. 12), and transmits it to the synchronization unit 100 via the bus during the low-level period of the data-enable signal. When the most significant bit (X) is set to "1", on the other hand, a SSMB code of a timing source that is currently selected by the synchronization unit 100 is inserted into a time slot (SSMB4 shown in FIG. 12), and is transmitted to each channel unit during the following low-level period of the data-enable signal. In this manner, the SSMB information is repeatedly exchanged by using a polling-selecting method at a formatting interval that is defined as a time span between two dashed timing lines in FIG. 12.

The synchronization unit 100 outputs an address "1001" when a timing source having a priority level 1 is currently selected, for example. An STM-n channel unit receiving this address compares the received priority level with its own priority level. If there is a match (i.e., if its own priority level is "X001"), an SSMB code of the S1 byte that is to be transmitted to a transfer line is set to all "1" in order to prevent an occurrence of a synchronization loop between networks or apparatuses. If there is no match, an SSMB code of the received SSMB is transmitted to the transfer line as the S1 byte. In the case of the 2 M-channel units, no function is provided for transmitting an SSMB code to a transfer line, so that no action is taken.

FIG. 14 is a table showing allocation of bit patterns to SSMB codes. This allocation is defined as ITU-T G. 708.

As shown in FIG. 14, SSMB codes are given their meanings. For example, an SSMB code "0010" means that an external clock has a timing quality of a cesium atomic oscillator. An SSMB code "0100" indicates a timing quality of a rubidium atomic oscillator. Further, an SSMB code "1011" indicates a timing quality of an SETS level. These four-bit SSMB codes are exchanged during low-level periods of the data-enable signal as described above.

As shown in FIG. 14, the SSMB codes are defined by ITU-T G. 708. In order to utilize these codes, a frame of reference is necessary to appraise a timing quality corresponding to each SSMD code.

FIG. 15 is a table showing an example of a quality list of SSMB codes used as such a frame of reference.

In this example, a smaller quality value indicates a higher timing quality. Namely, a timing quality having a quality value 2 is the highest, and a timing quality having a quality value 6 is the lowest.

The synchronization unit 100 includes a table of SSMB codes, and the microcomputer unit 5 sets a quality list with respect to the SSMB codes. Binary codes shown in the table of FIG. 15 indicate relationships between the SSMB codes and the quality list. When an SSMB code received by the synchronization unit 100 is "0010", for example, an address "02h" is confirmed by referring to the SSMB-code table. Further, a quality value "2" is obtained by finding a corresponding entry of the quality list. Such a conversion from an SSMB code to a quality value is performed by the synchronization unit 100. As can be seen from FIG. 15, different SSMB codes may have the same quality value. When the same quality values are found after the conversion, one with the highest priority level is selected.

Figure 16:
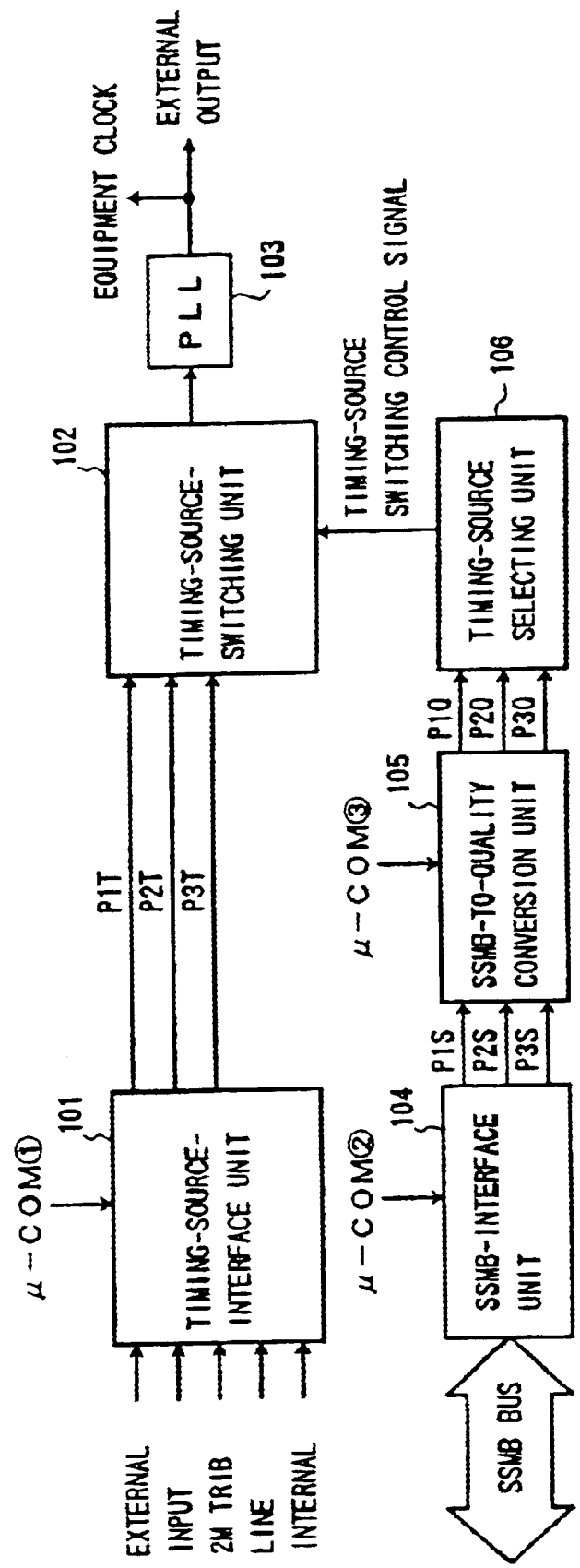
FIG. 16 is a block diagram showing a configuration of a synchronization-control portion of a synchronization unit.

FIG. 16 is a block diagram showing a configuration of a synchronization-control portion of the synchronization unit 100.

Since an overall operation of the synchronization-control portion is rather apparent from the description of the synchronization unit 100 given in the above, correspondences between the previous description and each block of FIG. 16 will be described below.

A timing-source-interface unit 101 of FIG. 16 receives as inputs thereto timing signals from the internal source 11, the 2 M tributary, the STM-n line, and the external input 9 of FIG. 11. Here, all the timing sources are provided as standard 2 M-interface signals (2.048 MHz & 2.048 Mbps).

The timing-source-interface unit 101 sets priority to timing sources in accordance with instructions from the microcomputer unit 5 provided by the user. In this example, three timing sources P1T through P3T are selected from the provided timing sources, and are given priority. Here, the timing source P1T has a priority level 1.

A timing-source switching unit 102 operates in accordance with instructions given from a timing-source selecting unit 106, and selects one of the three timing sources P1T through P3T. Selected timing source is supplied to a PLL unit 103. The PLL unit 103 synchronizes an equipment clock with the selected timing source, and distributes the synchronized equipment clock to interior circuits of the apparatus. Further, the synchronized equipment clock is output as an external output. This output is used as a synchronization clock by networks and/or switches or the like which do not support the SSMB operation.

An SSMB-interface unit 104 provides interface with the SSMB bus shown in FIG. 12. The SSMB-interface unit 104 selects SSMB codes P1S, P2S, and P3S according to the priority information given from the microcomputer unit 5. The priority information indicates the priority levels of timing sources that are set by the user. Here, an SSMB code P1S, for example, indicates an SSMB code of the priority level 1.

A SSMB-to-quality conversion unit 105 operates by using the quality list set by the microcomputer unit 5 as shown in FIG. 15, and converts the SSMB codes P1S, P2S, and P3S selected by the SSMB-interface unit 104 into respective quality values P1Q, P2Q, and P3Q. Here, the quality value P1Q corresponds to the SSMB code P1S, for example.

The timing-source selecting unit 106 compares the quality values received from the SSMB-to-quality conversion unit 105 with each other, and select a quality value having the highest quality. The timing-source selecting unit 106 then instructs the timing-source switching unit 102 to select a timing source corresponding to the selected highest quality. If there is more than one identical quality value, one having the highest priority is selected.

Figure 17:
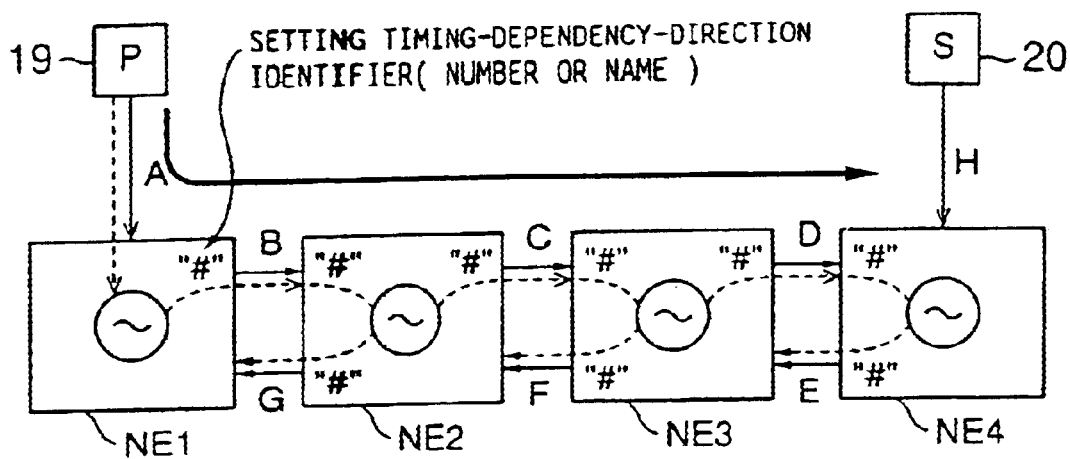
FIG. 17 is an illustrative drawing showing a schematic operation of a network according to the present invention.

FIG. 17 is an illustrative drawing showing a schematic operation of a network according to the present invention.

In FIG. 17, a direction of synchronization dependency (timing dependency) in the SDH network is shown by a thick arrow, starting from the primary master clock 19 and extending to the gateway network element NE1, the network element NE2, the network element NE3, and the network element NE4.

In order to allow each network element to identify the direction of timing dependency, the gateway network element NE1 forming the basis of synchronization in this SDH network sets an identifier (number or name) indicative of the direction of timing dependency. Then, each network element NE successively transfers this timing-dependency-direction identifier.

For example, the gateway network element NE1 may set "#" to the timing-dependency-direction identifier. Then, the gateway network element NE1 transmits information indicative of the timing-dependency-direction identifier "#" to the transfer line B.

The network element NE2 operating in synchronism with the gateway network element NE1 uses the transfer line B as a timing source, and detects the timing-dependency-direction identifier transferred via the transfer line B. If the detected timing-dependency-direction identifier is "#", therefore, it can be ascertained that the network element NE2 has a timing thereof depending on the gateway network element NE1. The network element NE3 operating in synchronism with the network element NE2 uses the transfer line C as a timing source, and detects the timing-dependency-direction identifier transferred via the transfer line C.

If the detected timing-dependency-direction identifier is "#", it can be ascertained that the network element NE3 has a timing thereof depending on the network element NE2, and that the timing ultimately depends on the gateway network element NE1 via the network element NE2. By the same token, the network element NE4 operating in synchronism with the network element NE3 uses the transfer line D as a timing source, and detects the timing-dependency-direction identifier transferred via the transfer line D. If the detected timing-dependency-direction identifier is "#", it can be ascertained that the network element NE4 has a timing thereof depending on the network element NE3, and that the timing ultimately depends on the gateway network element NE1 via the network elements NE2 and NE3.

In this manner, the gateway network element sets a timing-dependency-direction identifier, and each network element depending therefrom successively transfers the timing-dependency-direction identifier to a next network element, thereby making it easy to identify a direction of timing dependency in an SDH network.

First Embodiment

A first embodiment of the present invention uses four upper bits of the S1 byte of MSOH for the purpose of exchanging a timing-dependency-direction identifier.

Figure 3:
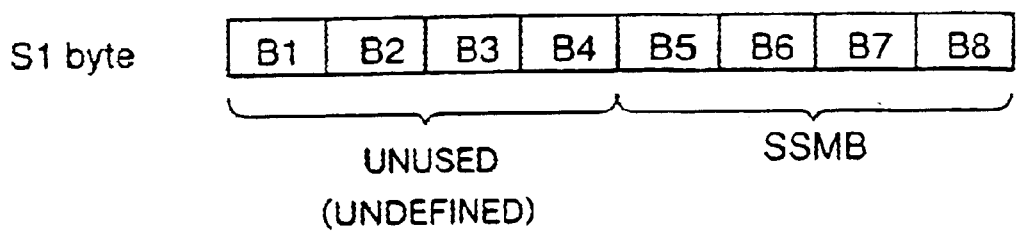
FIG. 3 is an illustrative drawing showing an S1 byte of an SOH.
Figure 4:
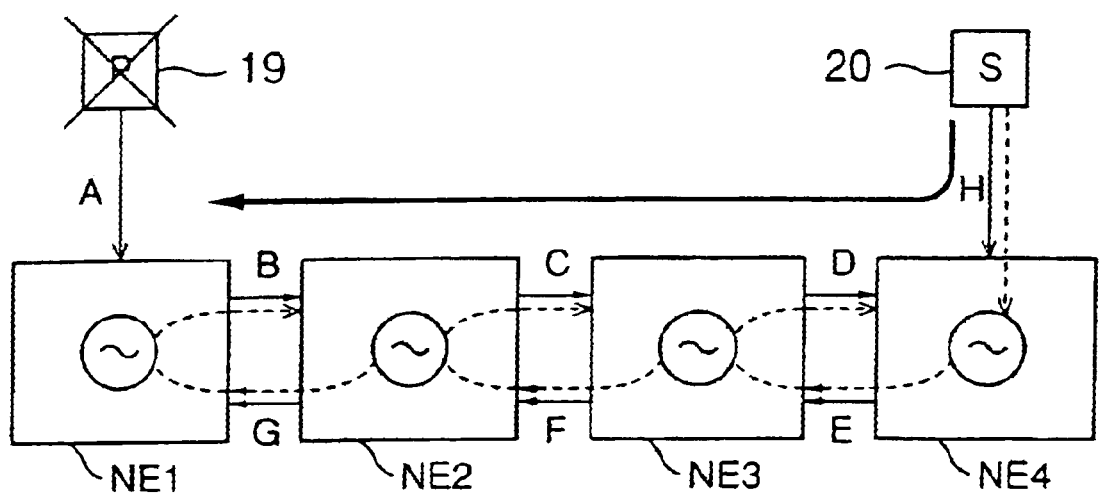
FIG. 4 is an illustrative drawing showing a situation where a failure occurs in a primary master clock or on an output transfer line thereof, and an external clock input from the primary master clock has a degraded quality.
Figure 5:
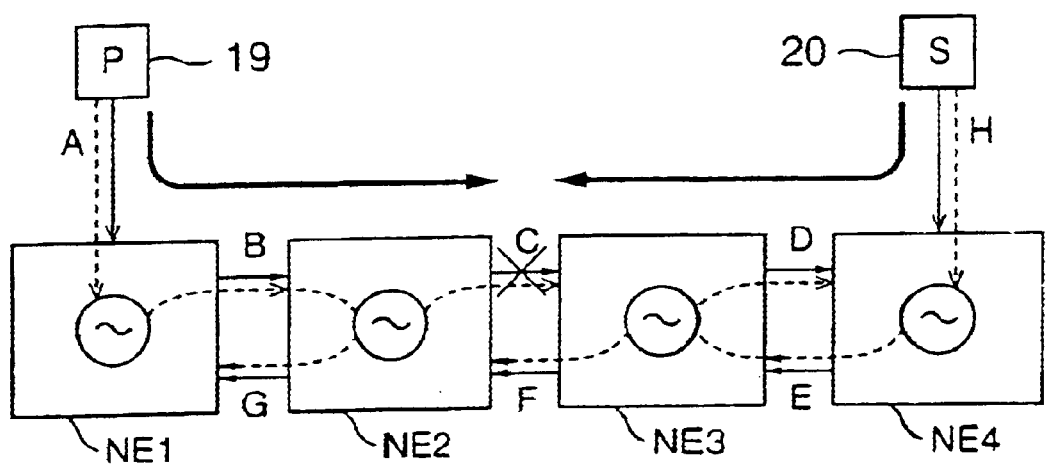
FIG. 5 is an illustrative drawing showing a situation where quality of a transfer line C degrades, and a timing source is switched in network elements NE3 and NE4.
Figure 6:
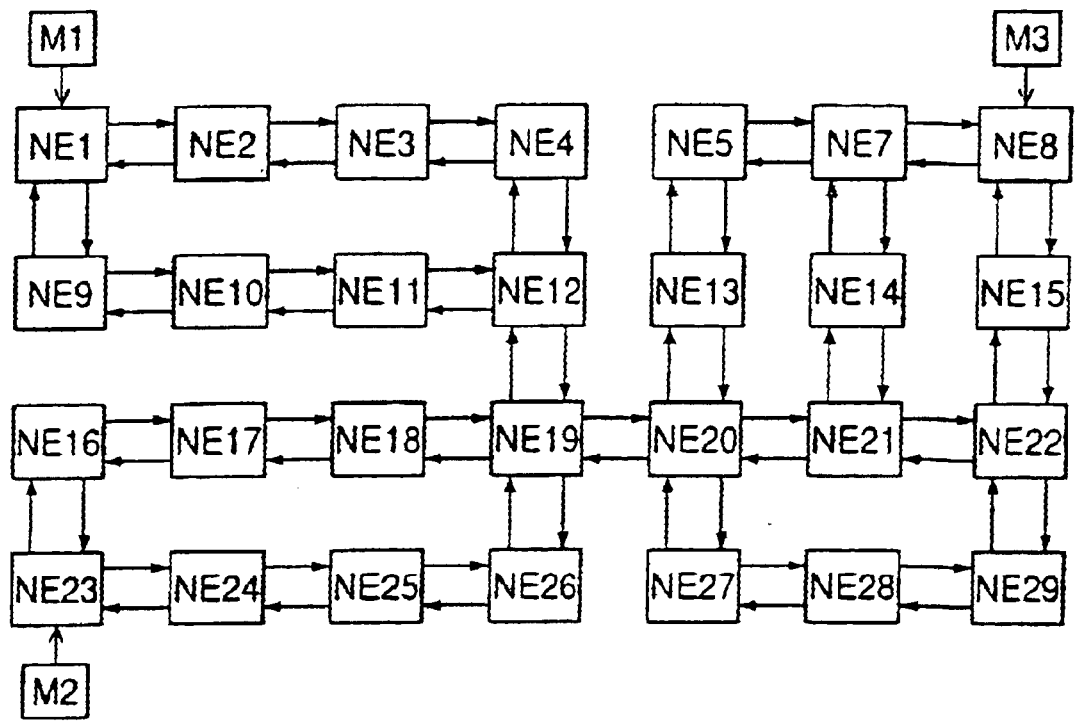
FIG. 6 is an illustrative drawing showing a schematic configuration of a mesh network.
Figure 7:
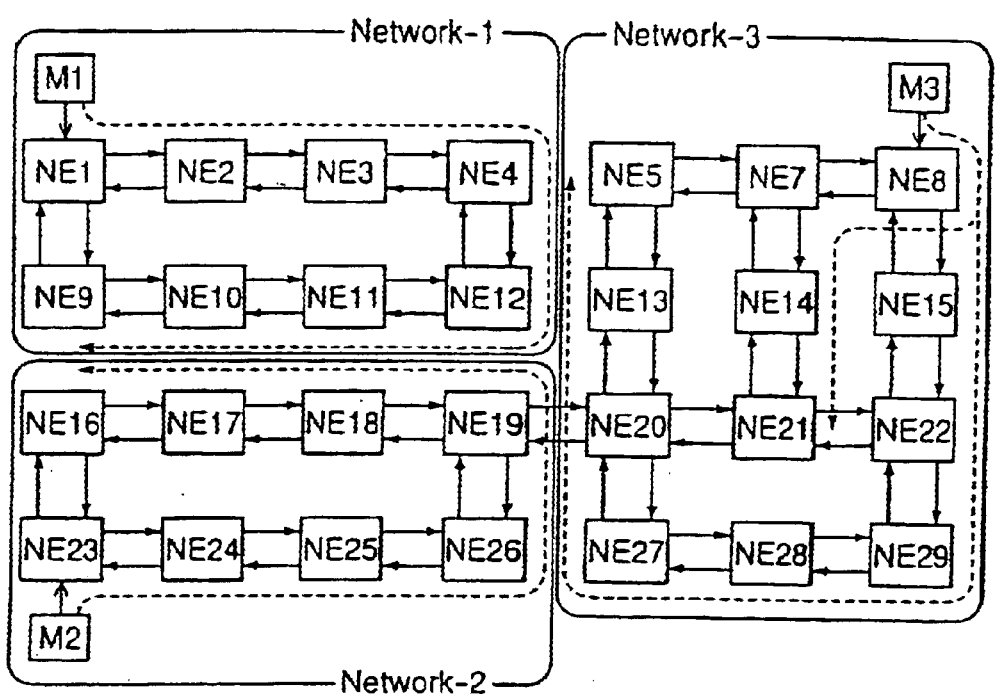
FIG. 7 is an illustrative drawing showing three SDH networks each having its own master clock.
Figure 8:
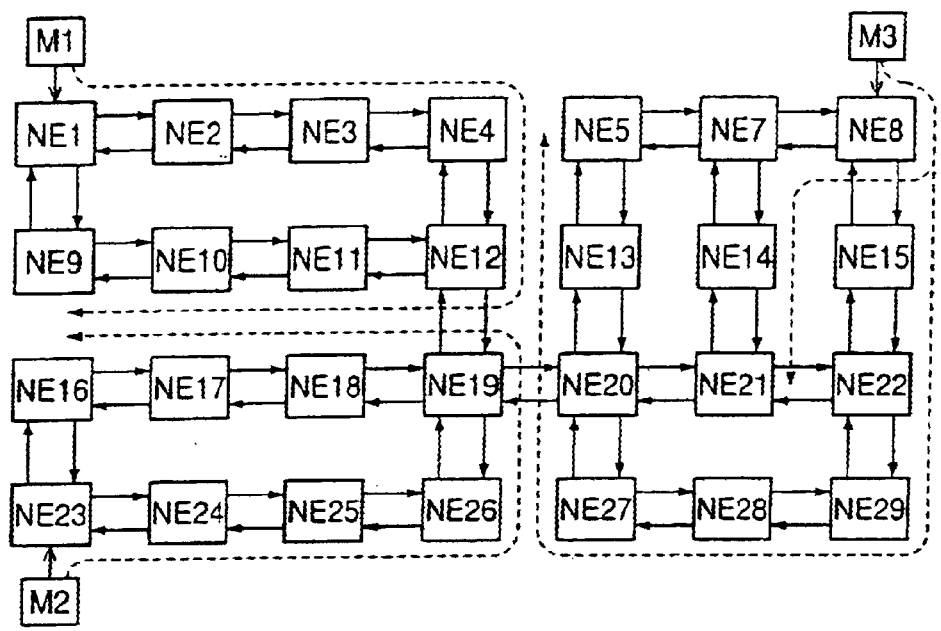
FIG. 8 is an illustrative drawing showing a process of integrating the three SDH networks via a network element of the second network.
Figure 9:
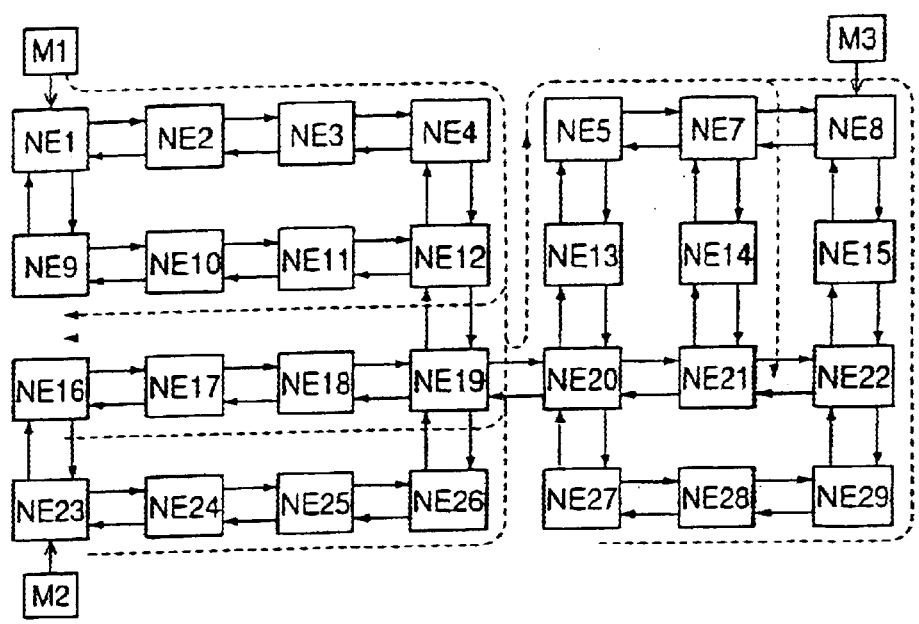
FIG. 9 is an illustrative drawing showing an integrated SDH network.

The S1 byte has a structure as shown in FIG. 3. Four lower bits are used for an SSMB code, and four upper bits are not used at present.

A gateway network element sets a binary number as a timing-dependency-direction identifier to these four upper bits. For example, a number "1010" may be set to identify a direction of timing dependency. Such a number may be set as a binary code "1010", or may be set as a hexadecimal code "A(H)".

Each network element decodes the four upper bits of an S1 byte when the S1 byte is extracted from data on a transfer line, and informs the microcomputer unit 5 of the decoded bit pattern, thereby identifying the timing-dependency-direction identifier number. Each network element sets the received timing-dependency-direction identifier number to the four upper bits of an S1 byte of MSOH, and outputs the S1 byte to the output transfer line.

Figure 18:
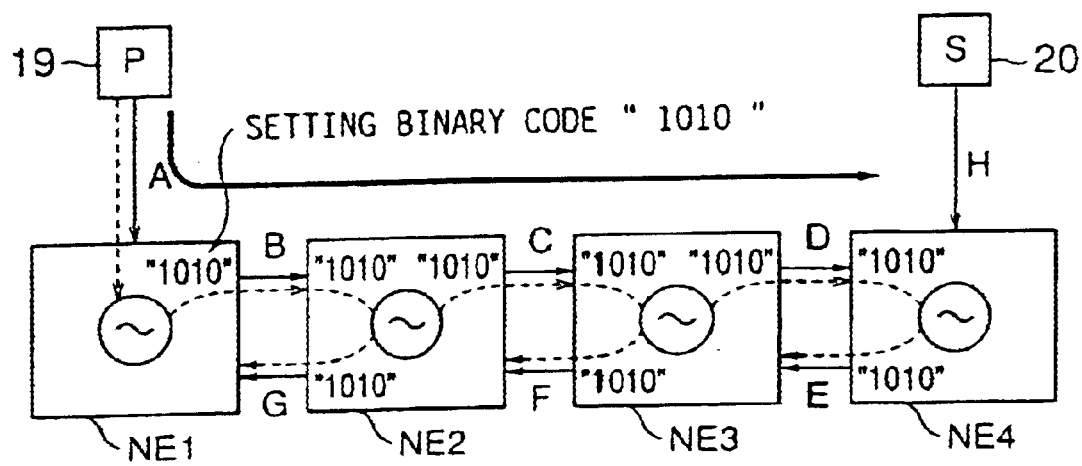
FIG. 18 is an illustrative drawing showing a case where a timing-dependency-direction identifier number is set by using a binary code.

FIG. 18 is an illustrative drawing showing a case where a timing-dependency-direction identifier number is set by using a binary code.

The gateway network element NE1 sets a timing-dependency-direction identifier number "1010", for example, to four upper bits of an S1 byte included in the MSOH of an STM-n signal. The timing-dependency-direction identifier number "1010" is transferred from the gateway network element NE1, the network element NE2, the network element NE3, to the network element NE4.

Because of this configuration, a direction of timing dependency can be easily identified with respect to each of the network elements by checking the timing-dependency-direction identifier number detected in each of the network elements. Since a check of a direction of timing dependency is easily made with respect to each network element, speedy implementation of a large network is facilitated, and erroneous setting of timing sources is eliminated.

Second Embodiment

In a second embodiment of the present invention, the number of bits used for representing a timing-dependency-direction identifier number is increased.

The first embodiment used the four upper bits of the S1 byte. This method is limited in terms of the number of timing-dependency-direction identifiers that can be used (maximum: 16).

In the second embodiment, an undefined byte of MSOH is used for exchanging a timing-dependency-direction identifier number. Since one full byte is used, 256 identifiers at maximum can be represented in this method.

Figure 1:
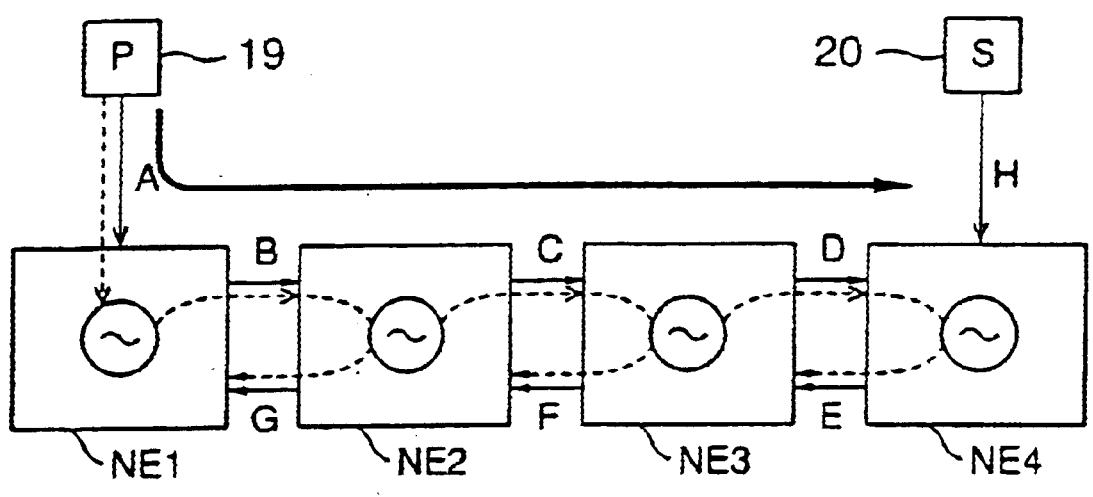
FIG. 1 is an illustrative drawing showing a schematic configuration of an SDH network.
Figure 2:
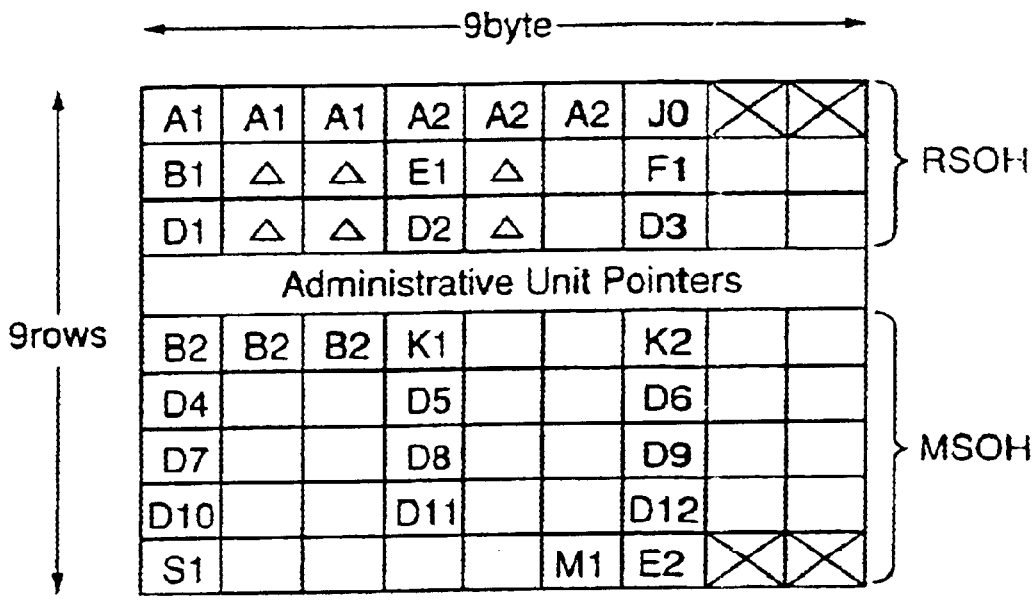
FIG. 2 is an illustrative drawing showing a format of an STM-1 overhead.

There are many undefined bytes in SOH of an STM-1 signal as shown in FIG. 2. In FIG. 2, blank portions indicate undefined bytes. The second embodiment of the present invention uses one of these undefined bytes for the purpose of exchanging a timing-dependency-direction identifier number.

A gateway network element sets a binary number as a timing-dependency-direction identifier to the undefined byte. For example, a number "10101010" may be set to identify a direction of timing dependency. Such a number may be set as a binary code "10101010", or may be set as a hexadecimal code "AA(H)".

Each network element decodes the undefined byte extracted from data on a transfer line, and informs the microcomputer unit 5 of the decoded bit pattern, thereby identifying the timing-dependency-direction identifier number. Each network element sets the received timing-dependency-direction identifier number to the undefined byte of SOH, and outputs this byte to the output transfer line.

Figure 19:
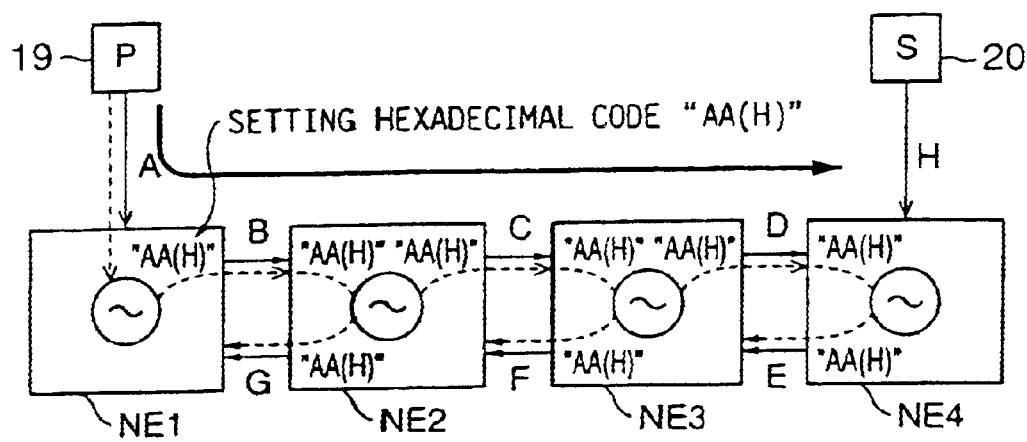
FIG. 19 is an illustrative drawing showing a case where a timing-dependency-direction identifier number is set to an undefined byte of SOH of an STM-n signal by using a hexadecimal code.

FIG. 19 is an illustrative drawing showing a case where a timing-dependency-direction identifier number is set to an undefined byte of SOH of an STM-n signal by using a hexadecimal code.

As shown in FIG. 19, a timing-dependency-direction identifier number "AA(H)" is transferred from the gateway network element NE1, the network element NE2, the network element NE3, to the network element NE4 by using an undefined byte of MSOH of an STM-n signal.

Because of this configuration, a direction of timing dependency can be easily identified with respect to each of the network elements by checking the timing-dependency-direction identifier number detected in each of the network elements. Since a check of a direction of timing dependency is easily made with respect to each network element, speedy implementation of a large network is facilitated, and erroneous setting of timing sources is eliminated.

Further, a timing-dependency-direction identifier number is represented by using one byte, so that timing-dependency-direction identifiers as many as up to 256 can be used in the network.

Third Embodiment

A third embodiment of the present invention sets ASCII codes to a timing-dependency-direction identifier utilizing a multi-frame configuration.

The second embodiment uses a binary code or a hexadecimal code set to an undefined byte as a timing-dependency-direction identifier. In the third embodiment, ASCII codes are used for exchanging of a timing-dependency-direction identifier in the same manner as main signals are exchanged by using a section trace or a path trace.

To this end, a name of a timing-dependency-direction identifier is transferred via a 16-multi-frame configuration using an undefined byte.

FIG. 20 is a table showing a 16-multi-frame configuration the same as used in the section trace or the path trace.

A most significant bit of each frame is a frame-synchronization signal. A frame synchronization is established by detecting repetitions of a bit pattern "1000000000000000". The most significant bit F0 of a frame number 0 is set to "1".

The second to eighth bits of the frame number 0 are CRC-7 parity bits.

A name of a timing-dependency-direction identifier is stored as ASCII codes in 1 through 15 frames of the 16 multi-frames. Namely, the name of a timing-dependency-direction identifier is comprised of 15 characters.

Figure 21:
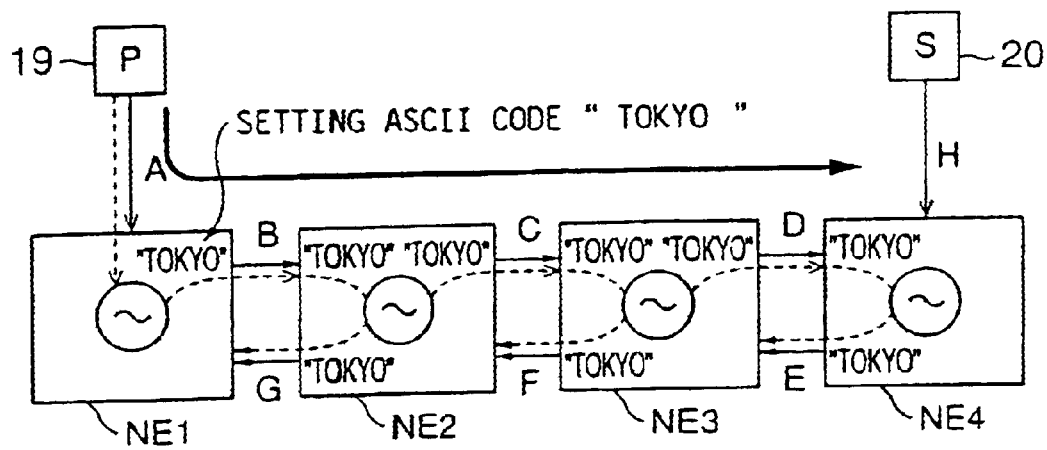
FIG. 21 is an illustrative drawing showing a case where a name of a timing-dependency-direction identifier is set as ASCII codes.

FIG. 21 is an illustrative drawing showing a case where a name of a timing-dependency-direction identifier is set as ASCII codes.

As shown in FIG. 21, a timing-dependency-direction identifier name "TOKYO" is transferred from the gateway network element NE1, the network element NE2, the network element NE3, to the network element NE4 by using an undefined byte of MSOH of an STM-n signal on a 16-multi-frame basis.

Because of this configuration, a direction of timing dependency can be easily identified with respect to each of the network elements by checking the timing-dependency-direction identifier name detected in each of the network elements. Since a check of a direction of timing dependency is easily made with respect to each network element, speedy implementation of a large network is facilitated, and erroneous setting of timing sources is eliminated.

Further, a timing-dependency-direction identifier name is represented by using ASCII codes, so that a name easy to recognize and matching a network configuration can be used.

Fourth Embodiment

A fourth embodiment relates to a scheme that can be applied to any one of the first through third embodiments. In the first through third embodiments, each network element NE monitors a timing-dependency-direction identifier as it is received, and transfers the received timing-dependency-direction identifier, which is all that each network element NE does.

In the fourth embodiment, each network element NE has an expected timing-dependency-direction identifier (i.e., an expected identifier name or an expected identifier number), and compares the expected timing-dependency-direction identifier with a received timing-dependency-direction identifier. If there is a mismatch, an alarm is generated.

Figure 22:
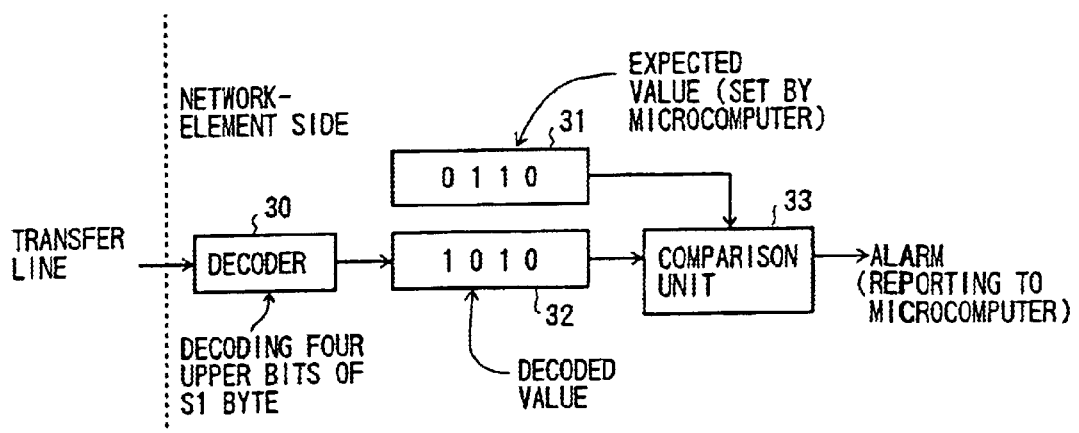
FIG. 22 is a block diagram showing a schematic configuration according a fourth embodiment of the present invention.
Figure 23:
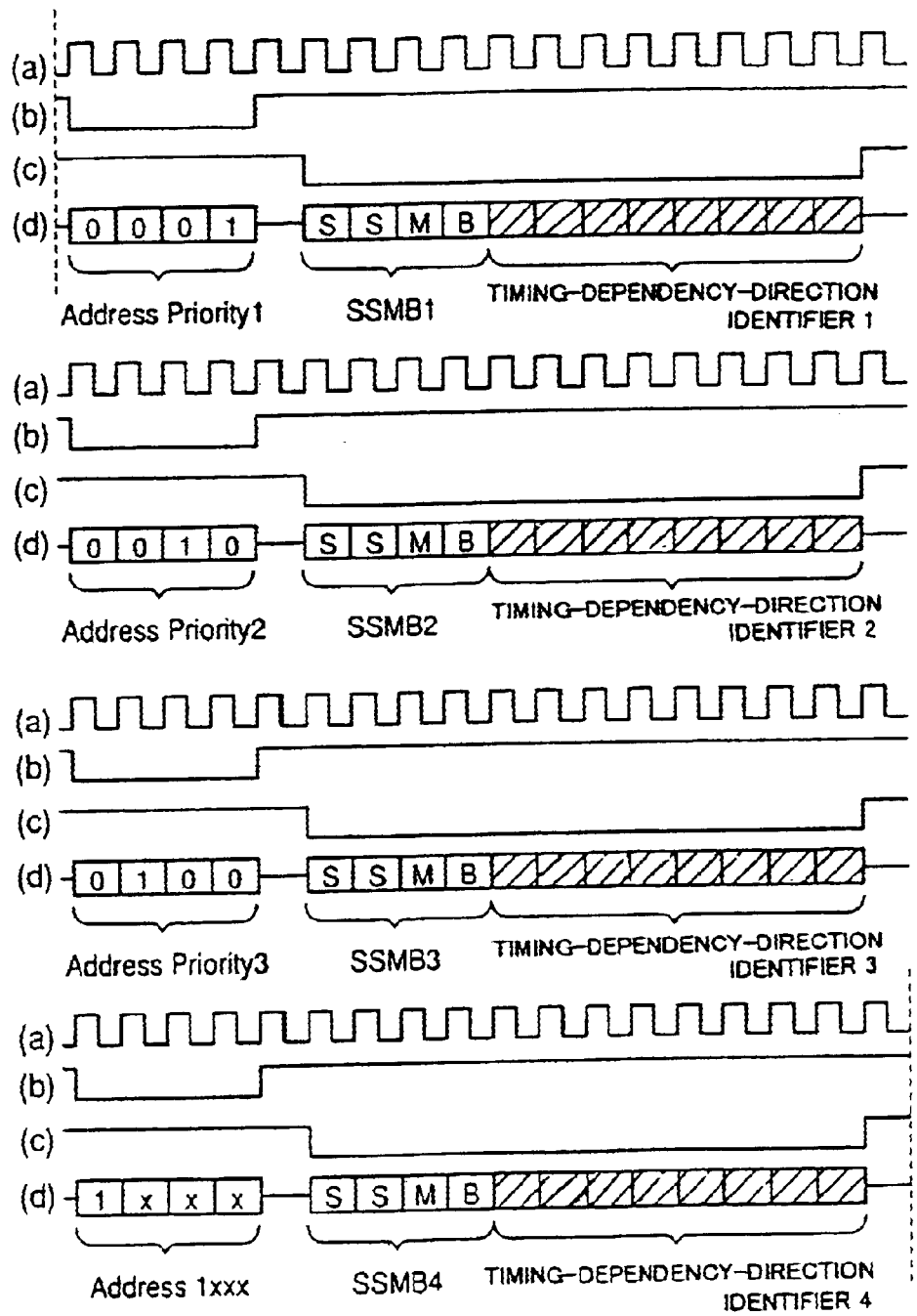
FIGS. 23A through 23D are timing charts for explaining a method of exchanging timing-dependency-direction identifiers via the SSMB bus.

FIG. 22 is a block diagram showing a schematic configuration according the fourth embodiment of the present invention. FIG. 22 shows an example in which four upper bits of an S1 byte is used as a timing-dependency-direction identifier in the same manner as in the first embodiment.

A signal is received from a transfer line, and a decoder 30 decodes a timing-dependency-direction identifier number. A decoded value 32 output from the decoder 30 is supplied to a comparison unit 33. The comparison unit 33 compares the decoded value 32 with a expected value 31 that is set by the microcomputer unit 5 (see FIG. 10). If the decoded value 32 matches the expected value 31, no action is taken with regard to alarming. If there is a mismatch, on the other hand, a mismatch alarm is reported to the microcomputer unit 5.

FIGS. 23A through 23D are timing charts for explaining a method of exchanging timing-dependency-direction identifiers via the SSMB bus. These figures relates to the first through fourth embodiments of the present invention.

The SSMB-bus lines carry a clock signal (a), an address-enable signal (b), a data-enable signal (c), and address/data-bus signals (d). The address/data-bus signals include a priority level, a SSMB code, and a timing-dependency-direction identifier.

A timing-dependency-direction identifier 1 is extracted from a timing source (STM-n) having a priority level 1. A timing-dependency-direction identifier 2 is extracted from a timing source (STM-n) having a priority level 2. A timing-dependency-direction identifier 3 is extracted from a timing source (STM-n) having a priority level 3. A timing-dependency-direction identifier 4 is an identifier that is set with respect to a gateway network element, or is an identifier of a currently selected timing source (STM-n). In FIGS. 23A through 23D, 8 bits are used for representing a timing-dependency-direction identifier, so that either the second embodiment or the third embodiment can be implemented. There is a need for only four bits in the first embodiment, so that a timing-dependency-direction identifier can be represented by four bits in the case of the first embodiment.

The gateway network element needs to have a timing-dependency-direction identifier thereof being set. Regardless of a currently selected timing source, therefore, a setting of a timing-dependency-direction identifier 4, for example, is inserted into a signal, and is transmitted to each STM-n channel unit. Each STM-n channel unit transmits this timing-dependency-direction identifier to a counterpart network element. In this manner, the gateway network element transfers the timing-dependency-direction identifier to counterpart network elements.

A network element other than the gateway network element extracts a timing-dependency-direction identifier from a currently selected timing source (STM-n), and needs to transfer this information to a counterpart network element. To this end, an STM-n channel unit having a priority level thereof being set transmits a received SSMB code and a detected timing-dependency-direction identifier to the SSMB bus. The synchronization unit receives the SSMB code and the timing-dependency-direction identifier from the STM-n channel unit to which a priority level has been set. If the currently selected timing source is that of a priority level 1, for example, the timing-dependency-direction identifier 1 is inserted in place of the timing-dependency-direction identifier 4, and is transmitted to each STM-n channel unit. Each STM-n channel unit transmits the timing-dependency-direction identifier to a counterpart network element. In this manner, each network element sends a timing-dependency-direction identifier (i.e., an identifier number or an identifier name) to counterpart network elements.

Figure 24A:
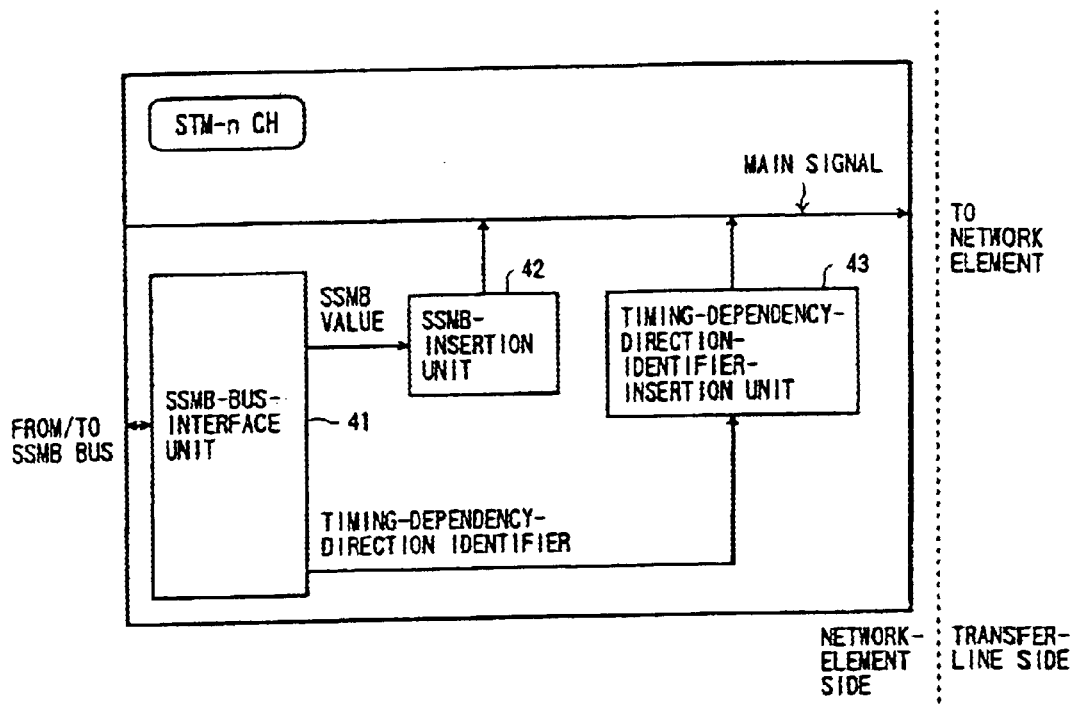
FIGS. 24A and 24B are block diagrams showing configurations for inserting and extracting timing-dependency-direction identifier of an STM-n channel unit, respectively.
Figure 24B:
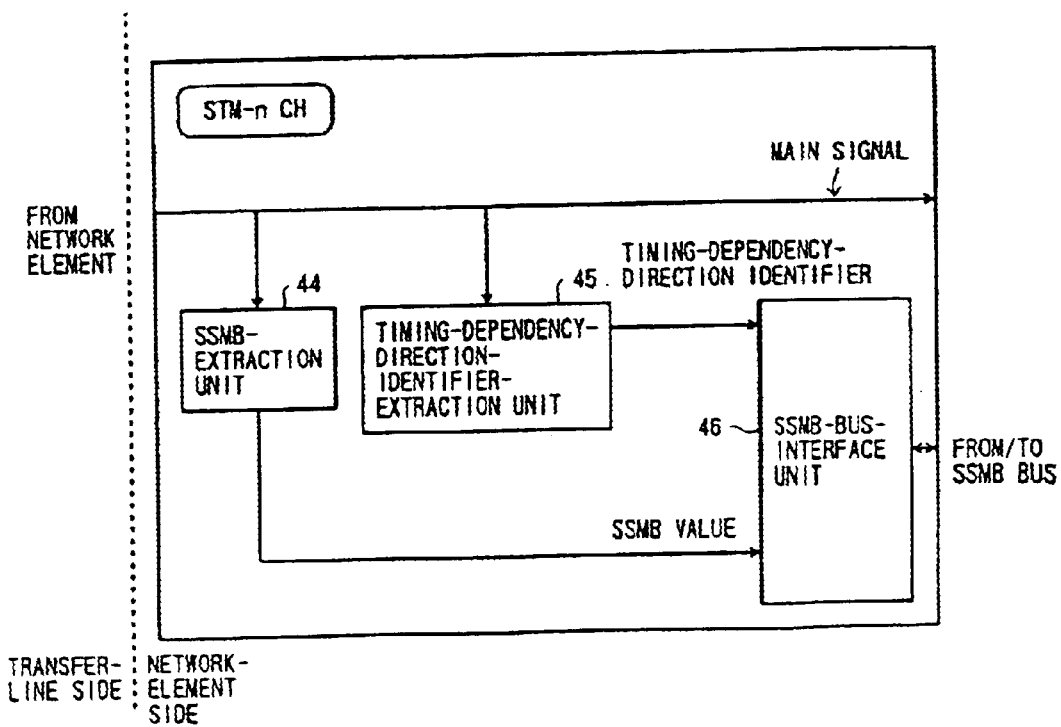

FIGS. 24A and 24B are block diagrams showing configurations for inserting and extracting timing-dependency-direction identifier of an STM-n channel unit, respectively.

A configuration of FIG. 24A for inserting a timing-dependency-direction identifier will be explained first with regard to an example in which an S1 byte of MSOH is used.

A STM-n channel unit on the insertion side includes an SSMB-bus-interface unit 41 for interfacing with the SSMB bus, an SSMB-insertion unit 42 for inserting an SSMB code, and a timing-dependency-direction-identifier-insertion unit 43 for inserting a timing-dependency-direction identifier.

In the STM-n channel unit on the insertion side, the SSMB-insertion unit 42 and the timing-dependency-direction-identifier-insertion unit 43 successively insert an SSMB code and a timing-dependency-direction identifier, respectively, into an S1 byte of MSOH of a main signal. The main is then transmitted to counterpart network elements.

A configuration of FIG. 24B for extracting a timing-dependency-direction identifier will be explained below with regard to the same example in which an S1 byte of MSOH is used.

An STM-n channel unit on the extraction side includes an SSMB-bus-interface unit 46 for interfacing with the SSMB bus, an SSMB-extraction unit 45 for extracting an SSMB code, and a timing-dependency-direction-identifier-extraction unit 45 for extracting a timing-dependency-direction identifier.

In the STM-n channel unit on the extraction side, the SSMB-extraction unit 44 and the timing-dependency-direction-identifier-extraction unit 45 successively extract an SSMB code and a timing-dependency-direction identifier, respectively, from an S1 byte of MSOH of a main signal. The extracted information is then transmitted to the SSMB bus via the SSMB-bus-interface unit 46.

In the description given above, the timing-dependency-direction identifier may be an identifier number or an identifier name, and the identifier number and the identifier name are interchangeable with each other without a fundamental modification to the system configuration.

Further, the present invention is not limited to these embodiments, but various variations and modifications may be made without departing from the scope of the present invention.

The present application is based on Japanese priority application No. 11-039102 filed on Feb. 17, 1999, with the Japanese Patent Office, the entire contents of which are hereby incorporated by reference.

What is claimed is:

1. An apparatus which depends on one of a plurality of master clocks as a timing source, comprising:

a timing-dependency-direction-identifier-extraction unit which detects an identifier indicative of a direction of timing dependency from a received signal with respect to each of the master clocks;

a timing-quality-information-extraction unit which detects s code indicative of a timing quality from the received signal with respect to each of the master clocks; and a synchronization unit which selects the timing source based on the code indicative of a timing quality, and identifies a direction of timing dependency of the timing source based on the identifier indicative of a direction of timing dependency;

wherein the received signal includes a header comprised of control data, and the identifier indicative of a direction of timing dependency is set in an undefined portion of a predetermined byte of the header.

2. The apparatus as claimed in claim 1, wherein said timing-dependency-direction-identifier-extraction unit extracts the identifier indicative of a direction of timing dependency from the undefined portion of the predetermined byte of the header, and said synchronization unit sets the identifier indicative of a direction of timing dependency regarding the timing source in the undefined portion of the predetermined byte of the header, and transmits the header to an adjacent apparatus.

3. The apparatus as claimed in claim 1, wherein said synchronization unit sets the identifier indicative of a direction of timing dependency regarding said one of a plurality of master clocks in the undefined portion of the predetermined byte of the header if said apparatus directly receives an output of said one of a plurality of master clocks.

4. An apparatus which depends on one of a plurality of master clocks as a timing source, comprising:
- a timing-dependency-direction-identifier-extraction unit which detects an identifier indicative of a direction of timing dependency from a received signal with respect to each of the master clocks;
- a timing-quality-information-extraction unit which detects s code indicative of a timing quality from the received signal with respect to each of the master clocks; and
- a synchronization unit which selects the timing source based on the code indicative of a timing quality, and identifies a direction of timing dependency of the timing source based on the identifier indicative of a direction of timing dependency;
- wherein the received signal includes a header comprised of control data, and the identifier indicative of a direction of timing dependency is set in a predetermined byte undefined in the header.

5. The apparatus as claimed in claim 4, wherein said timing-dependency-direction-identifier-extraction unit extracts the identifier indicative of a direction of timing dependency from the predetermined byte of the header, and said synchronization unit sets the identifier indicative of a direction of timing dependency regarding the timing source in the predetermined byte of the header, and transmits the header to an adjacent apparatus.

6. The apparatus as claimed in claim 4, wherein said synchronization unit sets the identifier indicative of a direction of timing dependency regarding said one of a plurality of master clocks in the predetermined byte of the header if said apparatus directly receives an output of said one of a plurality of master clocks.

7. An apparatus which depends on one of a plurality of master clocks as a timing source, comprising:
- a timing-dependency-direction-identifier-extraction unit which detects an identifier indicative of a direction of timing dependency from a received signal with respect to each of the master clocks,
- a timing-quality-information-extraction unit which detects s code indicative of a timing quality from the received signal with respect to each of the master clocks; and
- a synchronization unit which selects the timing source based on the code indicative of a timing quality, and identifies a direction of timing dependency of the timing source based on the identifier indicative of a direction of timing dependency,
- wherein the received signal includes headers comprised of control data, and the identifier indicative of a direction of timing dependency is set in a predetermined byte undefined in each of the headers on a multi-frame basis.

8. The apparatus as claimed in claim 7, wherein said timing-dependency-direction-identifier-extraction unit extracts the identifier indicative of a direction of timing dependency from the-predetermined byte of the headers, and said synchronization unit sets the identifier indicative of a direction of timing dependency regarding the timing source in the predetermined byte of the headers on a multi-frame basis, and transmits the header to an adjacent apparatus.

9. The apparatus as claimed in claim 7, wherein said synchronization unit sets the identifier indicative of a direction of timing dependency regarding said one of a plurality of master clocks in the predetermined byte of the headers on a multi-frame basis if said apparatus directly receives an output of said one of a plurality of master clocks.

10. An apparatus which depends on one of a plurality of master clocks as a timing source, comprising:
- a timing-dependency-direction-identifier-extraction unit which detects an identifier indicative of a direction of timing dependency from a received signal with respect to each of the master clocks;
- a timing-quality-information-extraction unit which detects s code indicative of a timing quality from the received signal with respect to each of the master clocks; and
- a synchronization unit which selects the timing source based on the code indicative of a timing quality, and identifies a direction of timing dependency of the timing source based on the identifier indicative of a direction of timing dependency;
- further comprising a comparison unit which compares an expected value of an identifier indicative of a direction of timing dependency with the detected identifier indicative of a direction of timing dependency, and generates an alarm if there is a mismatch in the comparison.

11. A method of identifying a direction of timing dependency for an apparatus which depends on one of a plurality of master clocks as a timing source, comprising the steps of:
- a) detecting timing-source information about the master clocks from received signals; and
- b) identifying a direction of timing dependency of the timing source based on the timing-source information and wherein said step a) includes the steps of:
  - detecting an identifier indicative of a direction of timing dependency as the timing-source information with respect to each of the masters clocks; and
  - detecting a code indicative of a timing quality as the timing-source information with respect to each of the master clocks, and wherein said step b) includes the steps of:
    - selecting the timing source based on the code indicative of a timing quality; and
    - identifying the direction of timing dependency of the timing source based on the identifier indicative of a direction of timing dependency.

12. The method as claimed in claim 11, wherein said step a) includes a step of extracting the timing-source information from an undefined portion of a predetermined byte of a header included in the received signals.

13. The method as claimed in claim 11, wherein said step a) includes a step of extracting the timing-source information from a predetermined byte undefined in a header included in the received signals.

14. The method as claimed in claim 11, wherein said step a) includes a step of extracting the timing-source information from a predetermined byte undefined in headers included in the received signals on a multi-frame basis.

* * * * *